US009282381B2

(12) United States Patent
Dhruv et al.

(10) Patent No.: US 9,282,381 B2
(45) Date of Patent: *Mar. 8, 2016

(54) MEDIA PLAYBACK CONTROL (71) Applicant: CBS Interactive Inc., San Francisco, CA (US)

(72) Inventors: Jignesh Yashwant Dhruv, Monmouth Junction, NJ (US); Shalitha Arosha Senanayake, Hidden Valley Lake, CA (US); Christopher Peter Xiques, Oakland, CA (US)

(73) Assignee: CBS Interactive Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,295

(22) Filed: Apr. 17, 2015

(65) Prior Publication Data
US 2015/0249869 A1 Sep. 3, 2015

Related U.S. Application Data (63) Continuation of application No. 13/018,312, filed on Jan. 31, 2011, now Pat. No. 9,049,494.

(51) Int. Cl.
*G06F 17/00* (2006.01)
*H04N 7/10* (2006.01)
(Continued)

(52) U.S. Cl.
CPC ...... *H04N 21/6543* (2013.01); *G06F 17/30017* (2013.01); *H04N 21/23424* (2013.01);
(Continued)

(58) Field of Classification Search
CPC .......... H04N 21/6543; H04N 21/8543; H04N 21/8456; H04N 21/44016; H04N 21/812; H04N 21/26258; H04N 21/8445; H04N 21/8453; H04N 21/23424; G06F 17/30017
USPC .................. 700/94; 725/32–36; 709/230–237
See application file for complete search history.

(56) References Cited

U.S. PATENT DOCUMENTS 5,999,912 A * 12/1999 Wodarz et al. ............. 705/14.61
6,698,020 B1 * 2/2004 Zigmond et al. ................ 725/34
(Continued)

FOREIGN PATENT DOCUMENTS

WO  WO 2009/152447 A2  12/2009
WO  WO 2010/078281 A2  7/2010

OTHER PUBLICATIONS

"HTTP Live Streaming," Pantos, R. et al., (Eds.), Apple Inc., Mar. 31, 2011, 24 pages, [Online] [Retrieved on Jul. 23, 2012] Retrieved from the Internet<URL:http://tools.ietf.org/html/draft-pantos-http-live-streami-ng-06>.
(Continued)

*Primary Examiner* — Ken Vanderpuye
*Assistant Examiner* — Dibson Sanchez
(74) *Attorney, Agent, or Firm* — Fenwick & West LLP (57) ABSTRACT

Disclosed herein are systems, methods, and non-transitory computer-readable storage media for performing an action during playback based on a media manifest file. A system, such as a media player, configured to practice the method receives a media manifest, extracts, from the media manifest, a list of media chunks and at least one tag associated with the list of media chunks. The list of media chunks can describe two or more separate media assets. Then the system parses the at least one tag to identify an action to perform during playback and a playback position to perform the action. The system retrieves, for playback, at least one media chunk associated with the playback position from the list of media chunks, and, during playback of the at least one media chunk and at the playback position, performs the action. Modifying the media playback control can include temporarily disabling a media playback control.

20 Claims, 8 Drawing Sheets

(51) Int. Cl.
*G06F 15/16* (2006.01)
*H04N 21/6543* (2011.01)
*H04N 21/8543* (2011.01)
*H04N 21/262* (2011.01)
*H04N 21/44* (2011.01)
*H04N 21/81* (2011.01)
*H04N 21/845* (2011.01)
*G06F 17/30* (2006.01)
*H04N 21/234* (2011.01)

(52) U.S. Cl.
CPC ... *H04N21/26258* (2013.01); *H04N 21/44016* (2013.01); *H04N 21/812* (2013.01); *H04N 21/8453* (2013.01); *H04N 21/8455* (2013.01); *H04N 21/8456* (2013.01); *H04N 21/8543* (2013.01)

(56) References Cited

U.S. PATENT DOCUMENTS

| | | | |
|---|---|---|---|
| 7,203,758 B2* | 4/2007 | Cook et al. | 709/231 |
| 7,546,625 B1* | 6/2009 | Kamangar | 725/93 |
| 7,836,511 B2* | 11/2010 | Hydrie et al. | 726/27 |
| 7,860,996 B2* | 12/2010 | Musayev et al. | 709/231 |
| 8,060,407 B1* | 11/2011 | Delker et al. | 705/14.68 |
| 8,099,473 B2 | 1/2012 | Biderman et al. | |
| 8,209,396 B1* | 6/2012 | Raman | H04N 21/235 709/217 |
| 8,260,950 B1* | 9/2012 | Bertz et al. | 709/231 |
| 2002/0144262 A1* | 10/2002 | Plotnick et al. | 725/32 |
| 2002/0156912 A1* | 10/2002 | Hurst et al. | 709/236 |
| 2003/0093790 A1* | 5/2003 | Logan et al. | 725/38 |
| 2003/0110130 A1* | 6/2003 | Pelletier | 705/50 |
| 2003/0149621 A1 | 8/2003 | Shteyn | |
| 2003/0179621 A1* | 9/2003 | Kamei et al. | 365/200 |
| 2004/0003398 A1* | 1/2004 | Donian et al. | 725/34 |
| 2004/0243623 A1* | 12/2004 | Ozer et al. | 707/102 |
| 2005/0262539 A1 | 11/2005 | Barton et al. | |
| 2006/0225105 A1* | 10/2006 | Russ | H04N 7/17318 725/78 |
| 2008/0098423 A1* | 4/2008 | Malik | 725/34 |
| 2008/0120324 A1* | 5/2008 | Davis | 707/102 |
| 2008/0127245 A1* | 5/2008 | Olds | 725/32 |
| 2008/0152300 A1* | 6/2008 | Knee et al. | 386/68 |
| 2008/0163289 A1* | 7/2008 | Keys | 725/32 |
| 2008/0206732 A1* | 8/2008 | Zalewski | 434/323 |
| 2009/0049090 A1* | 2/2009 | Shenfield et al. | 707/104.1 |
| 2009/0093278 A1* | 4/2009 | Negron et al. | 455/567 |
| 2009/0094520 A1* | 4/2009 | Kulas | 715/723 |
| 2009/0157500 A1* | 6/2009 | Ames et al. | 705/14 |
| 2009/0222850 A1* | 9/2009 | Darnell | 725/32 |
| 2009/0248672 A1* | 10/2009 | McIntire et al. | 707/5 |
| 2009/0265214 A1* | 10/2009 | Jobs et al. | 705/10 |
| 2009/0313122 A1* | 12/2009 | Funk et al. | 705/14.53 |
| 2010/0005488 A1* | 1/2010 | Rakib et al. | 725/34 |
| 2010/0030645 A1* | 2/2010 | Watanuki et al. | 705/14.53 |
| 2010/0036906 A1* | 2/2010 | Song et al. | 709/203 |
| 2010/0169459 A1* | 7/2010 | Biderman et al. | 709/219 |
| 2010/0222046 A1* | 9/2010 | Cumming | 455/418 |
| 2010/0275235 A1* | 10/2010 | Joo et al. | 725/74 |
| 2010/0332565 A1* | 12/2010 | Al-Shaykh et al. | 707/912 |
| 2011/0123168 A1* | 5/2011 | Cho et al. | 386/230 |
| 2011/0145857 A1* | 6/2011 | Agarwal et al. | 725/32 |
| 2011/0145858 A1* | 6/2011 | Philpott et al. | 725/32 |
| 2011/0307781 A1* | 12/2011 | Sood et al. | G11B 27/34 715/716 |
| 2012/0110620 A1* | 5/2012 | Kilar et al. | 725/34 |

OTHER PUBLICATIONS

"HTTP Live Streaming Overview: HTTP Streaming Architecture," Apple Inc., 2010, Last updated Apr. 1, 2011, 5 pages, [Online] [Retrieved on Jul. 23, 2012] Retrieved from the Internet<URL:http://developer.apple.com/library/ios/#documentation/networkinginternet/conceptual/streamingmediaguide/HT-TPStreamingArchitecture/H-TTPStreamingArchitecture.html>.

"Http Live Streaming Protocol Specification: HTTP Live Streaming," Apple Inc., 2009, Last updated Mar. 15, 2009, 10 pages, [Online] [Retrieved on Jul. 23, 2012] Retrieved from the Internet<URL:http://developer.apple.com/library/ios/#documentation/Net-workingInternet/Conceptual/HTTPLiveStreaming/_index.html>.

"Technical Note TN2224: Best Practices for Creating and Deploying HTTP Live Streaming Media for the iPhone and iPad," Apple Inc., 2010, Last updated Aug. 3, 2011, 9 pages, [Online] [Retrieved on Jul. 23, 2012] Retrieved from the Internet<URL:http://developer.apple.com/library/ios/#technotes/tn2224/-_index.html>.

"FFmpeg Documentation," FFmpeg.org, 1 page, [Online] [Retrieved on Mar. 14, 2012] Retrieved from the Internet<URL:http://www.ffmpeg.org/documentation.html>.

"MPlayer Documentation," The MPlayer Project, 2000-2011, 1 page, [Online] [Retrieved on Mar. 14, 2012] Retrieved from the Internet<URL:http://www.mplayerhq.hu/design7/documentation.html>.

"Linux Encoding," 8 pages, [Online] [Retrieved on Mar. 14, 2012] Retrieved from the Internet<URL:http://sites.google.com/site/linuxencoding/x264-- ffmpeg-mapping>.

"HTTP Live Streaming Overview: Using HTTP Live Streaming," Apple Inc., 2010, Last updated Apr. 1, 2011, 10 pages, [Online] [Retrieved on Jul. 23, 2012] Retrieved from the Internet<URL:http://developer.apple.com/library/ios/#documentation/networkinginternet/conceptual/streamingmediaguide/UsingHT-TPLiveStreaming/Usin-gHTTPLiveStreaming.html#//apple_ref/doc/uid/TP40008332-CH102-SW1>-.

HTTP Live Streaming, Pantos, R. et al., (Eds.), Apple Inc., Jun. 8, 2009, 10 pages, [Online] [Retrieved on May 21, 2012] Retrieved from the Interent<http://tools.ietf.org/html/draft-pantos-http-live-streaming-0- 1>.

"Is it possible to embed other m3u8 files in a main m3u8 file?" osdir.com, 3 pages, [Online] [Retrieved on Mar. 14, 2012] Retrieved from the Internet<URL:http://osdir.com/ml/streaming-server-dev/2011-02/msg00004- .html>.

PCT International Search Report and Written Opinion, PCT Application No. PCT/US2012/023198, Mar. 27, 2012, 11 pages.

United States Office Action, U.S. Appl. No. 13/018,312, May 22, 2014, 22 pages.

United States Office Action, U.S. Appl. No. 13/018,312, Oct. 28, 2013, 20 pages.

United States Office Action, U.S. Appl. No. 13/018,312, May 2, 2013, 11 pages.

United States Office Action, U.S. Appl. No. 13/018,312, Oct. 17, 2012, 11 pages.

* cited by examiner

MEDIA PLAYBACK CONTROL

RELATED APPLICATIONS

This application is a continuation of U.S. application Ser. No. 13/018,312 entitled "Media Playback Control," to Jignesh Yashwant Dhruv, Shalitha Arosha Senanayake, and Christopher Peter Xiques filed on Jan. 31, 2011, the contents of which are incorporated by reference herein.

BACKGROUND

1. Technical Field

The present disclosure relates to media distribution and more specifically to controlling aspects of a media player during playback based on a media manifest file.

2. Introduction

Media distribution, including video distribution, via the Internet is a source of problems for many reasons, including video encoding formats, bandwidth, playback device capabilities, different screen sizes and resolutions, and so forth. Some manufacturers provide a set of guidelines for media distributors as a standard or generally accepted way to stream media to that manufacturer's devices, such as a standard chunk size for streaming media. Certain video playback devices, such as the Apple iPad®, prefer video content to be streamed not continuously, but as a series of discrete "chunks" of video outlined in a manifest file, such as an m3u8 file. The iPad® receives the manifest file that contains links to each of the chunks of video content, and processes the manifest file to retrieve and play back each chunk in turn. However, the m3u8 format imposes several limitations, including the inability to control or guide the conduct of the media player. This inability to control the media player may not be a problem for singular content, such as a full-length motion picture. However, for content that is supported by advertising, such as a television show, this inability is an impediment to delivering advertisements, ensuring that the advertisements are not skipped, and/or controlling other aspects of the media consumption experience. The limitations of a manifest file in controlling a media playback device are apparent in other situations as well.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for adapting a media player during playback based on tags in a media manifest file. The system, such as a media player, receives a media manifest and extracts, from the media manifest, a list of media chunks and at least one tag associated with the list of media chunks, wherein the list of media chunks describes at least two separate media assets. Then the system parses the at least one tag to identify an action to perform during playback and a playback position to perform the action. The system retrieves, for playback, at least one media chunk from the list of media chunks, and, during playback of the at least one media chunk and at the playback position, performs the action. Some applications of this system can disable playback controls of a media player, via tags in a manifest file such as an m3u8 file, during an advertisement stitched into the m3u8 file. Example manifest files include an m3u8 file or a Media Player Classic Play List (MPCPL) file. These manifest files include links to each chunk in a set of media chunks representing a media asset and, optionally, advertisements inserted in the media asset. A media playback device can process the pointers sequentially to fetch and play the video asset chunk by chunk.

Also disclosed are systems, methods, and non-transitory computer-readable storage media for generating a manifest file for playback on a media player. An example system configured to practice this method first receives, from the media player, a request for a media asset. Then the system identifies a manifest file containing first pointers to media chunks for playing the media asset and inserts, in the manifest file, second pointers to advertising media chunks. The system also inserts, in the manifest file, a tag for controlling the media player to perform an action during playback of the advertising media chunks. Then the system transmits the manifest file to the media player, causing the media player to receive and play back the streamed media based on the manifest file.

A system for playing back media according to a manifest file includes a processor, a receiving module configured to control the processor to receive a media manifest, a manifest processing module configured to control the processor to extract from the media manifest a list of media chunks, a playback module configured to control the processor to retrieve and play the media chunks listed in the manifest, and a tag processing module configured to control the processor to determine, while playing the media chunks, an action based on a tag in the media manifest, and to perform the action. Some possible actions the system can take include disabling media playback controls, such as fast forward or seek.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure.

The present disclosure addresses the need in the art for streaming video. A brief introductory description of a basic general purpose system or computing device in FIG. 1A which can be employed to practice the concepts is disclosed herein. FIG. 1B illustrates an exemplary media streaming system architecture. A more detailed description of exemplary video manifest files, approaches to "stitching" advertising into a manifest file, and method embodiments will then follow. Variations shall be discussed herein as the various embodiments are set forth. The disclosure now turns to FIG. 1A.

Figure 1A:
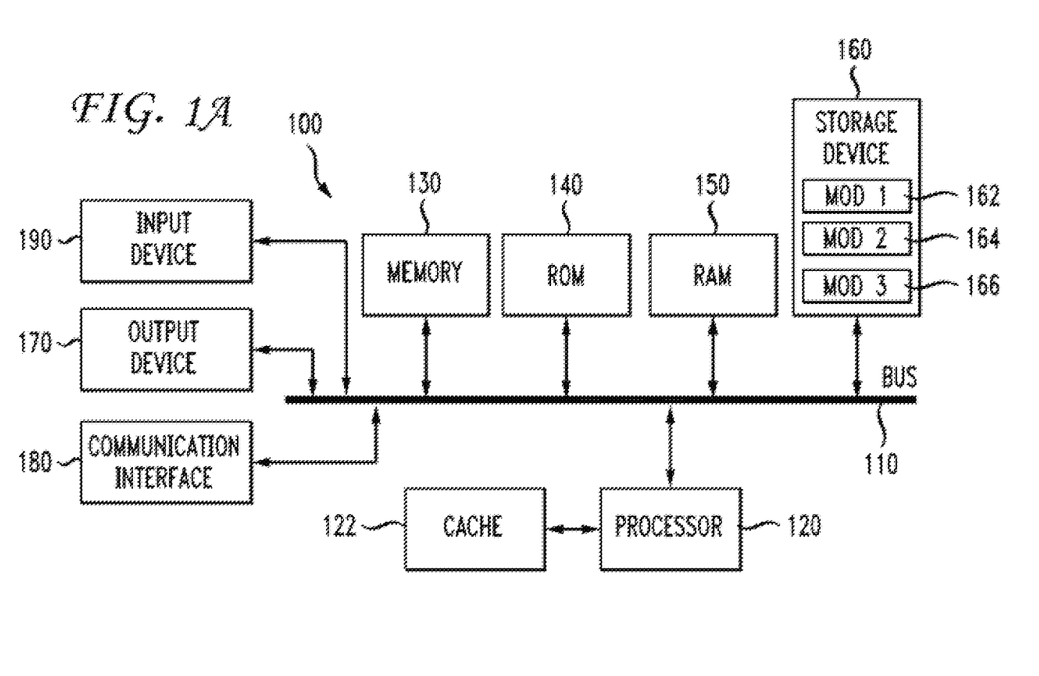
FIG. 1A illustrates an example system embodiment.
Figure 1B:
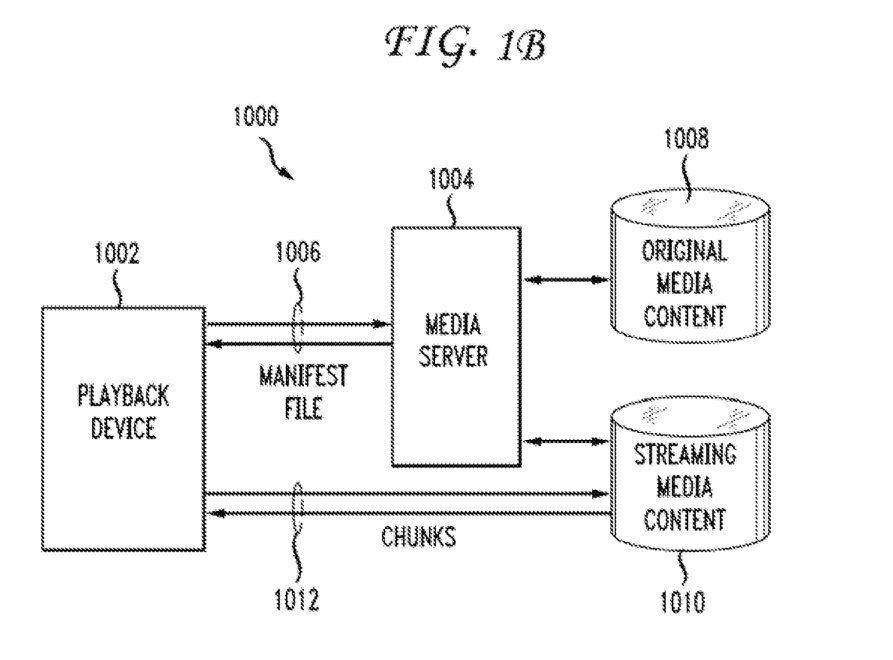
FIG. 1B illustrates an example media streaming system embodiment.

With reference to FIG. 1A, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as solid state drives, magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1A may be provided by a single shared processor or multiple processors. (Use of the term "processor" should not be construed to refer exclusively to hardware capable of executing software.) Illustrative embodiments may include application-specific integrated circuits (ASICs) and/or field-programmable gate arrays (FPGAs) as well as microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1A can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1A illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now turns to FIG. 1B, which illustrates an example media streaming system embodiment 1000. The communications between the entities depicted in FIG. 1B can occur via one or more wired or wireless networks. Further, the devices can communicate directly, via the World Wide Web, and/or via an application programming interface (API). A playback device 1002, such as a tablet device, smartphone, desktop or portable computer, set-top box, Internet-enabled television, media center PC, or any other suitable device, first makes a request to a media server 1004 for playback of media content, such as an episode of Star Trek. Typically the media server 1004 resides in a network such as the Internet, but can reside entirely or partially in any of the playback device or a local network for example. The media server 1004 receives the request and generates or fetches a manifest file 1006 to send to the playback device 1002 in response to the request. Typically the manifest file is sent in one direction, but the communication can be one- or two-way. The manifest file can include links to the main requested media content, as well as links to advertising content, metadata, formatting information, and tags for controlling the media player. Example formats for the manifest file 1006 include the m3u, m3u8, mpcpl, and fpl formats. The mpcpl manifest file format is primarily associated with 'Media Player Classic'. The fpl manifest file format is primarily associated with the foobar2000 media player. The principles disclosed herein can operate using any appropriate manifest file format. An m3u8 file is a specific variation of an m3u encoded using UTF-8 Unicode characters. The m3u file format was initially used in the Winamp Media Player for only audio files, but has since become a de facto playlist standard on many media devices for local and/or streaming media, including music and other media types. Many media devices employ variations of the m3u file format, any of which can be used according to the principles set forth herein. A manifest file can include links to media files as relative or absolute paths to a location on a local file system, or as a network address, such as a Uniform Resource Identifier (URI) path. The m3u8 format is used herein as a non-limiting example to illustrate the principles of manifest files.

The manifest file 1006 includes a list of pointers to sequential chunks of the requested media content. The contents of a representative m3u8 manifest file for a 32-second video asset are provided below:

```
#EXTM3U
#EXT-X-MEDIA-SEQUENCE:0
#EXT-X-TARGETDURATION:10
#EXTINF:10,
http://streaming.exampleurl.com/chunk1.ts
```

-continued

```
#EXTINF:10,
http://streaming.exampleurl.com/chunk2.ts
#EXTINF:6,
http://streaming.exampleurl.com/chunk3.ts
#EXTINF:6,
http://streaming.exampleurl.com/chunk4.ts
#EXT-X-ENDLIST
```

Before or at the time of the request, the media server 1004 generates or identifies the chunks 1012 of the requested media content as streaming media content 1010. The chunks of the streaming media content 1010 are generated either by the media server 1004, the content producer, or some other entity, by splitting the original media content 1008. Upon receiving the manifest file 1006, the playback device 1002 can fetch a first chunk for playback from the streaming media content 1010, and, during playback of that chunk, fetch a next chunk for playback after the first chunk, and so on until the end of the media content. The functionality of the entities depicted in FIG. 1B can be performed by a larger or smaller number of entities. For example, a single entity can perform the combined functionalities of multiple shown entities in FIG. 1B. Similarly, the functionality of a single shown entity in FIG. 1B can be divided among several entities. For example, an first ingestion server can ingest the original media content 1008 to produce the streaming media content 1010, while a second customer-facing server can service requests for manifest files, and a third media streaming server streams the actual chunks indicated by the links in the manifest file.

Having set forth the general architecture of streaming media to playback devices, the disclosure turns to a discussion of stitching advertisements into segmented video for streaming, including some specific examples. As set forth above, certain devices, such as the Apple iPad®, require a video manifest file, such as an m3u8 file, for streaming media. One problem with an m3u8 file is that other manifest files cannot be embedded therein. The disclosure now turns to a discussion of how to "stitch" advertisements into a manifest file for presentation to such a playback device.

Figure 2:
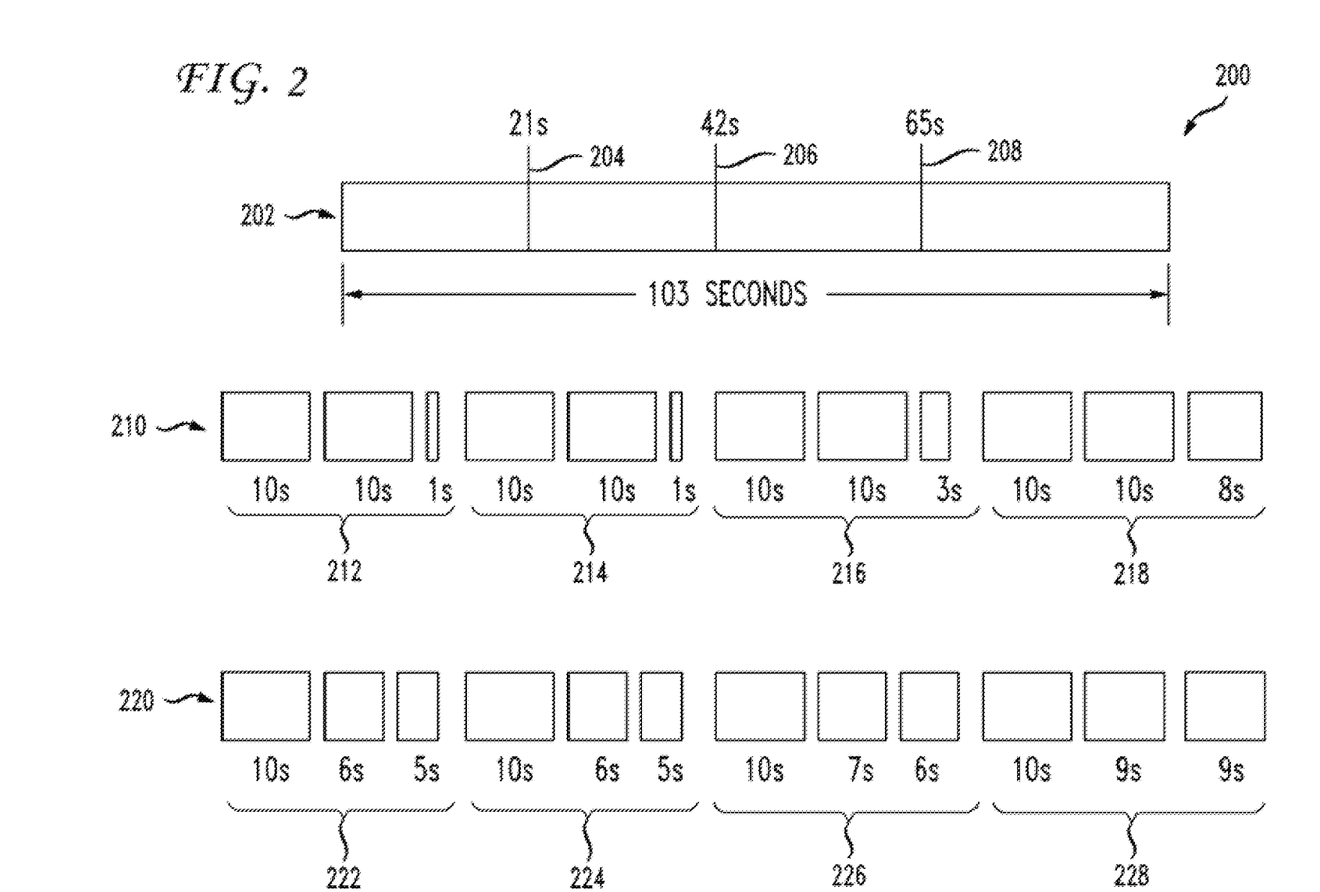
FIG. 2 illustrates splitting a media file into chunks based on chapter breaks.

FIG. 2 illustrates an example of segmenting a 103-second media file 202 having chapter breaks 204, 206, 208 into chunks. For purposes of illustration, and not by way of limitation, the examples herein are discussed in terms of a maximum chunk size of 10 seconds and key frames that occur every 1 second. The same principles can be applied in situations with other chunk sizes and key frame frequencies. The media file can be a video file, including, but not limited to, video formats such as an MPEG transport stream (or MPEG-TS) file according to ISO/IEC standard 13818-1, an MPEG-4 part 14 (MP4) file according to ISO/IEC standard 14496:14: 2003, an Ogg Theora file according to the video compression format developed by the Xiph.org foundation, or other suitable media types, including audio, text, images, video enhancement layers, metadata, interactive media, and so forth. The various media file segments and advertising segments can be of a same or different media file types. For example, the media file segments can be in MPEG-TS format and the advertising segments can be in MP4 format.

The first set of chunks 210 illustrates the existing approach of placing any remaining time in the final chunk. As can be seen, the first two chapters 212, 214 have a final 1-second chunk and the third chapter 216 final 3-second chunk, each of which can cause video streaming performance problems. Only the last chapter 218 has a final chunk of a reasonable size, 8 seconds, and that is at the end of the media file where the final chunk size does not matter as much.

Using a best-fit algorithm for generating chunks based on the chapter boundaries, the segmenter can generate a second set of chunks 220. The first chapter 222 is divided into a 10-second chunk, a 6-second chunk, and a 5-second chunk. The second chapter 224 is divided into a 10-second chunk, a 6-second chunk, and a 5-second chunk. The third chapter 226 is divided into a 10-second chunk, a 7-second chunk, and a 6-second chunk. The fourth chapter 228 is divided into one 10-second chunks and two 9-second chunks. An example m3u8 file for streaming the second set of chunks 220 without any advertisements is provided below:

```
#EXTM3U
#EXT-X-MEDIA-SEQUENCE:0
#EXT-X-TARGETDURATION:10
#EXTINF:10,
    http://streaming.contentserver.com/chapter1_chunk1.ts
#EXTINF:6,
    http://streaming.contentserver.com/chapter1_chunk2.ts
#EXTINF:5,
    http://streaming.contentserver.com/chapter1_chunk3.ts
#EXTINF:10,
    http://streaming.contentserver.com/chapter2_chunk1.ts
#EXTINF:6,
    http://streaming.contentserver.com/chapter2_chunk2.ts
#EXTINF:5,
    http://streaming.contentserver.com/chapter2_chunk3.ts
#EXTINF:10,
    http://streaming.contentserver.com/chapter3_chunk1.ts
#EXTINF:7,
    http://streaming.contentserver.com/chapter3_chunk2.ts
#EXTINF:6,
    http://streaming.contentserver.com/chapter3_chunk3.ts
#EXTINF:10,
    http://streaming.contentserver.com/chapter4_chunk1.ts
#EXTINF:9,
    http://streaming.contentserver.com/chapter4_chunk2.ts
#EXTINF:9,
    http://streaming.contentserver.com/chapter4_chunk3.ts
#EXT-X-ENDLIST
```

Figure 3:
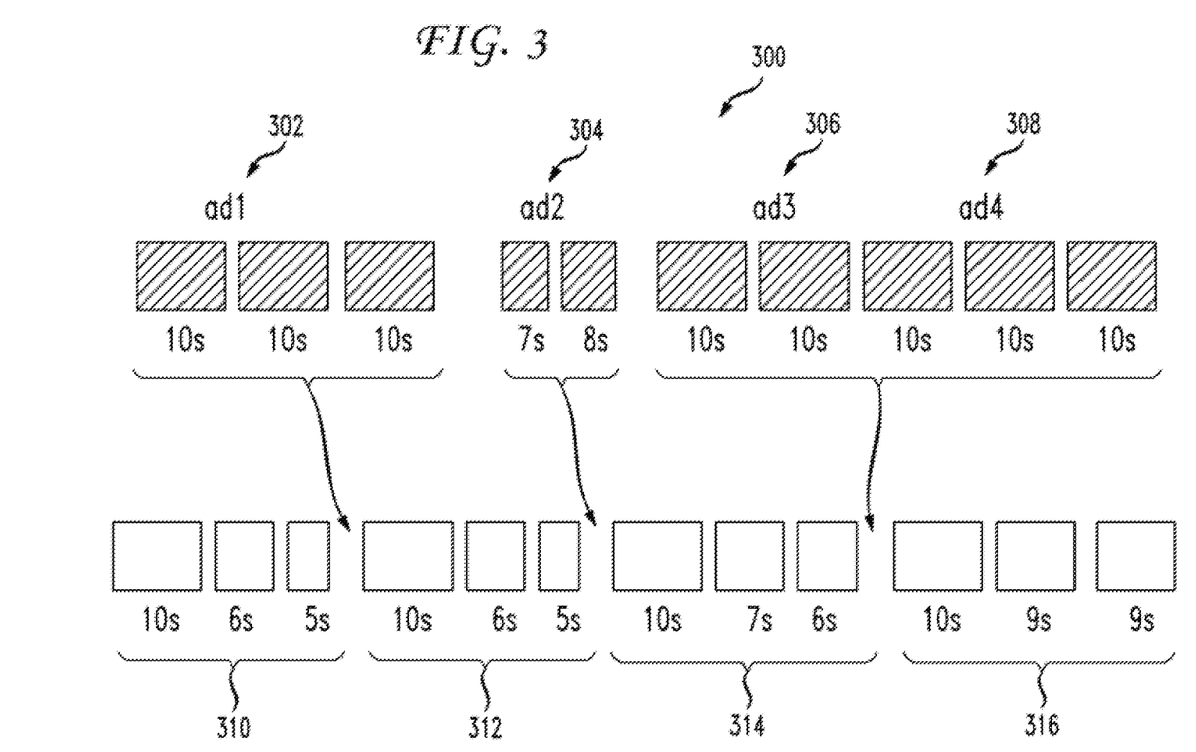
FIG. 3 illustrates advertising media split into chunks.
Figure 4:
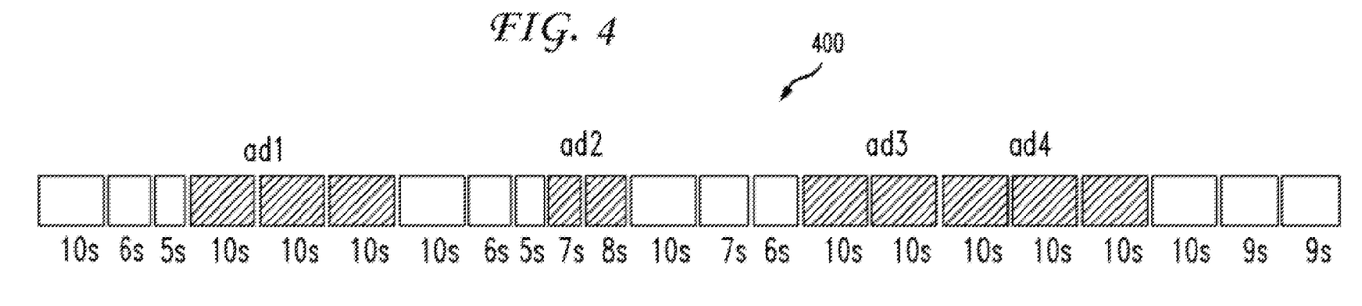
FIG. 4 illustrates the media file chunks with the advertising media chunks at the chapter breaks.

FIG. 3 illustrates advertising media 300, specifically four advertisements 302, 304, 306, 308 already split into chunks. The system identifies the four chapters 222, 224, 226, 228 and the boundaries between the chapters. Then the system can insert, in the manifest file, the advertisements into the respective locations. The system can select and pair the advertisements with breaks randomly or according to time constraints, advertiser fees, media file content, and/or other promotional data. FIG. 4 illustrates the media file chunks 400 with the advertising media chunks inserted at the various chapter breaks. An example manifest file generated by the system with inserted advertising chunks is provided below:

```
#EXTM3U
#EXT-X-MEDIA-SEQUENCE:0
#EXT-X-TARGETDURATION:10
#EXTINF:10,
    http://streaming.contentserver.com/chapter1_chunk1.ts
#EXTINF:6,
    http://streaming.contentserver.com/chapter1_chunk2.ts
#EXTINF:5,
    http://streaming.contentserver.com/chapter1_chunk3.ts
#AD-BEGIN
#EXTINF:10,
    http://streaming.adserver1.com/chunk1.ts
#EXTINF:10,
    http://streaming.adserver1.com/chunk2.ts
#EXTINF:10,
    http://streaming.adserver1.com/chunk3.ts
#AD-END
#EXTINF:10,
    http://streaming.contentserver.com/chapter2_chunk1.ts
#EXTINF:6,
    http://streaming.contentserver.com/chapter2_chunk2.ts
#EXTINF:5,
    http://streaming.contentserver.com/chapter2_chunk3.ts
#AD-BEGIN
#EXTINF:7,
    http://streaming.adserver2.com/chunk1.ts
#EXTINF:8,
    http://streaming.adserver2.com/chunk2.ts
#AD-END
#EXTINF:10,
    http://streaming.contentserver.com/chapter3_chunk1.ts
#EXTINF:7,
    http://streaming.contentserver.com/chapter3_chunk2.ts
#EXTINF:6,
    http://streaming.contentserver.com/chapter3_chunk3.ts
#AD-BEGIN
#EXTINF:10,
    http://streaming.adserver3.com/chunk1.ts
#EXTINF:10,
    http://streaming.adserver3.com/chunk2.ts
#EXTINF:10,
    http://streaming.adserver3.com/chunk3.ts
#EXTINF:10,
    http://streaming.adserver4.com/chunk1.ts
#EXTINF:10,
    http://streaming.adserver4.com/chunk2.ts
#EXTINF:10,
    http://streaming.adserver4.com/chunk3.ts
#AD-END
#EXTINF:10,
    http://streaming.contentserver.com/chapter4_chunk1.ts
#EXTINF:10,
    http://streaming.contentserver.com/chapter4_chunk2.ts
#EXTINF:9,
    http://streaming.contentserver.com/chapter4_chunk3.ts
#EXTINF:9,
    http://streaming.contentserver.com/chapter4_chunk4.ts
#EXT-X-ENDLIST
```

As this example illustrates, while a manifest file is unable to contain other manifest files, the manifest file can contain links to chunks from multiple sources. For instance, the manifest file can include links to chunks on a single content server and one or more different advertising servers. Alternatively, the manifest file can include links to chunks on a single server that stores both content and advertising. The content chunks, for example, can be stored at different locations, although in a common scenario a content producer stores all the content chunks on a single server or cluster of servers. When the playback device receives the manifest file, the playback device fetches a first chunk and begins playing that chunk. As that chunk is playing, the playback device fetches the next chunk, and so on.

A content provider may desire to perform some action during playback of the advertisements, such as disabling certain playback controls, making a mobile device vibrate, determining and reporting a user's location, loading a companion advertisement, and so forth. An m3u8 manifest file by itself does not provide any mechanism to accomplish this functionality. However, the media player can be made to interpret specially crafted manifest file containing tags or other cues to perform such actions. For example, the media player can read a specific tag #DISABLE_FF 30 to disable a fast forward user interface element for 30 seconds. In such implementations of the technology, the media player and manifest file generator operate on a standard set of tags, cues, or messages that can be embedded in manifest files. The manifest file can include numerous different types of tags to control virtually every aspect of the media player, not only user interface elements. For example, one tag can trigger a tablet computing device to connect wirelessly to a nearby smart phone to load a companion advertisement on the nearby smart phone and/or on the tablet computing device. The manifest file can define a group of tags as a single combination tag, then the manifest file can refer to the combination tag and the media player can perform the actions in the defined group of tags. For instance, the manifest file can define a #30_SEC_AD combination tag as a collection of #DISABLE_PAUSE 30, #DISABLE_FF 30, #DISABLE_MUTE 30, and #DISABLE_SCREEN_ROTATION 30. Then, instead of including each of these individual tags at each 30-second advertisement, the manifest file can simply include a #30_SEC_AD tag. In one aspect, the manifest file can include these definitions in the beginning of the file, when the combination tag is first encountered, at some other location in the manifest file, or as a completely separate file. The media player can parse these combination tags and store them in memory for use during playback. This approach enables more complex sets of actions while reducing overall manifest complexity.

An example manifest file including inserted tags is provided below.

```
#EXTM3U
#EXT-X-MEDIA-SEQUENCE:0
#EXT-X-TARGETDURATION:10
#DEFINE-ACTION-BEGIN
#ACTION-TITLE 30-SEC-AD
#ACTION DISABLE_PAUSE 30
#ACTION DISABLE_FF 30
#ACTION DISABLE_MUTE 30
#DEFINE-ACTION-END
#DEFINE-ACTION-BEGIN
#ACTION-TITLE 15-SEC-AD
#ACTION DISABLE_PAUSE 15
#ACTION DISABLE_FF 15
#ACTION DISABLE_MUTE 15
#DEFINE-ACTION-END
#EXTINF:10,
http://streaming.contentserver.com/chapter1_chunk1.ts
#EXTINF:6,
http://streaming.contentserver.com/chapter1_chunk2.ts
#EXTINF:5,
http://streaming.contentserver.com/chapter1_chunk3.ts
#30-SEC-AD
#DISPLAY-COMPANION-AD
http://streaming.adserver1.com/companion.html
#EXTINF:10,
http://streaming.adserver1.com/chunk1.ts
#EXTINF:10,
http://streaming.adserver1.com/chunk2.ts
#EXTINF:10,
http://streaming.adserver1.com/chunk3.ts
#EXTINF:10,
http://streaming.contentserver.com/chapter2_chunk1.ts
#EXTINF:6,
http://streaming.contentserver.com/chapter2_chunk2.ts
#EXTINF:5,
http://streaming.contentserver.com/chapter2_chunk3.ts
#15-SEC-AD
#DEVICE-VIBRATE DURATION:0.5
#EXTINF:7,
http://streaming.adserver2.com/chunk1.ts
#EXTINF:8,
http://streaming.adserver2.com/chunk2.ts
#EXTINF:10,
http://streaming.contentserver.com/chapter3_chunk1.ts
#EXTINF:7,
http://streaming.contentserver.com/chapter3_chunk2.ts
#EXTINF:6,
http://streaming.contentserver.com/chapter3_chunk3.ts
#30-SEC-AD
```

-continued

```
#EXTINF:10,
http://streaming.adserver3.com/chunk1.ts
#EXTINF:10,
http://streaming.adserver3.com/chunk2.ts
#EXTINF:10,
http://streaming.adserver3.com/chunk3.ts
#ADVERTISEMENT-TRANSITION
#30-SEC-AD
#EXTINF:10,
http://streaming.adserver4.com/chunk1.ts
#EXTINF:10,
http://streaming.adserver4.com/chunk2.ts
#EXTINF:10,
http://streaming.adserver4.com/chunk3.ts
#EXTINF:10,
http://streaming.contentserver.com/chapter4_chunk1.ts
#EXTINF:10,
http://streaming.contentserver.com/chapter4_chunk2.ts
#EXTINF:9,
http://streaming.contentserver.com/chapter4_chunk3.ts
#EXTINF:9,
http://streaming.contentserver.com/chapter4_chunk4.ts
#EXT-X-ENDLIST
```

In this example manifest, the tag #DEFINE-ACTION-BEGIN signals to the media player that a new action is being defined. Two actions are defined in this example: 30-sec-ad and 15-sec-ad. Then, the manifest file refers to these actions, or collections of tag actions using the tag name. The example manifest also shows a #DISPLAY-COMPANION-AD tag with a URL to a companion ad asset. The #ADVERTISEMENT-TRANSITION tag can indicate to the player to quickly fade to black, then fade into the new advertisement, reset the media player controls, or perform any other suitable action. The #DEVICE-VIBRATE tag instructs the media player device to vibrate for the indicated duration. These and other tags can be used within the spirit and scope of the disclosure.

Figure 5A:
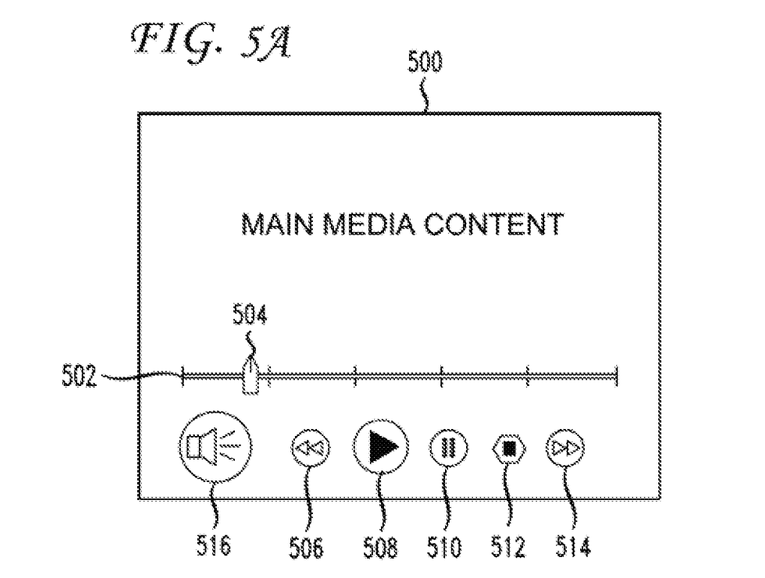
FIG. 5A illustrates an exemplary media player interface during playback of a main media asset.

FIG. 5A illustrates an exemplary media player interface 500 during playback of a main media asset, i.e. in a "normal" state. This interface 500 includes a playback progress bar 502 having lines indicating the location of commercial breaks. The interface 500 can include a volume control 516, a rewind button 506, a play button 508, a pause button 510, a stop button 512, and a fast forward button 514. This interface 500 is exemplary only and is not limiting. These and/or other elements can be included in the interface 500.

Figure 5B:
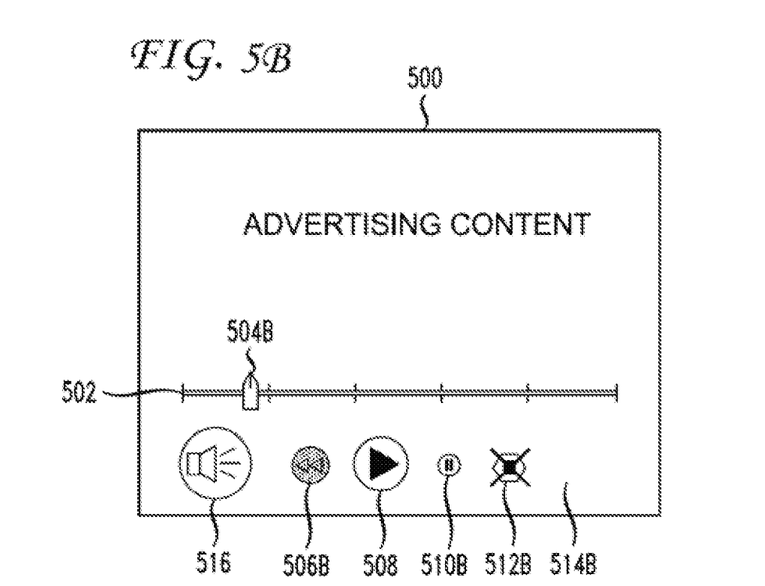
FIG. 5B illustrates an exemplary media player interface during playback of an advertising media asset, with certain playback elements modified.

FIG. 5B illustrates the exemplary media player interface 500 of FIG. 5A during playback of an advertising media asset, with certain playback elements modified based on one or more tags. In this example, the playback progress bar 502 shows a current position 504B at an advertisement break. In this example, the media player reads and parses the tags embedded in the manifest file, and acts on the parsed tags. Some example actions the media player can take are shown in this example. The media player can gray out elements, such as the grayed out rewind button 506B. User interface elements can be disabled but retain an unchanged appearance, such as the play button 508. User interface elements can change appearance, such as size, color, orientation, location, and so forth, such as the shrunk pause button 510B. The media player can also show disabled playback controls with overlaid images, such as the large X over the stop button 512B. In yet another aspect, certain user interface elements are temporarily removed entirely, such as the missing fast forward button 514B. The media player can decide how to display disabled or altered functionality. Alternatively, the tag in the manifest file can indicate or guide how the media player reflects the disabled or altered functionality.

While the examples disclosed herein are primarily provided in terms of disabling advertising controls during playback, as shown in FIGS. 5A and 5B, the tags can be used not only to disable playback user interface elements, but also to control any hardware and/or software aspect of the media player, the user interface, the media player's communications with other devices or with the user, and so forth. For example a tag in the manifest file can trigger a tablet media playback device to vibrate or rumble during a portion of the main media content when an explosion occurs, or when a gunshot is fired. As such, the tag can include a delay and/or a duration to time the vibration at a specific time after the current chunk starts. The manifest file can also trigger the media player to identify a nearby device suitable for keyboard input (such as a notebook or desktop computer, smart phone, tablet, etc.) if the media player is unable to accept keyboard input, prompt the user for input on the identified device (such as feedback on the media content, or participation in a survey or game) and/or otherwise interact with the user via the identified device through the media player. In one aspect, the identified device communicates with the user via the media player, but the media player can trigger a connection between the identified device and a remote server, at which point the media player simply continues playing the media content.

The user can establish content settings on the media player for responding to the tags. For example, if the manifest file contains tags indicating child-inappropriate portions of the media, the media player encounters such a tag, evaluates the tag based on the content settings, and decides whether to play or skip the tagged portion. In another variation, the manifest file contains tags (such as #IMPORTANCE xx) that mark portions of the media content with a relative importance to the overall story of the media content. For example, a major plot point, introduction of a main character, or other essential portion of the content can have a tag of #IMPORTANCE 99 while a less important portion of the content can have a tag of #IMPORTANCE 12. The user can indicate on the media player or as part of a user profile a desired viewing threshold or an amount of available time to view the content, for example. Then, based on the user's indication, the media player can determine which portions of the content to play and which to skip over to best accomplish the user's preference.

In another approach, the manifest file can provide a set of advertising playback policies for advertisements, and merely tag the beginning and end (or beginning and duration) of each advertising segment in the manifest file. The media player can determine how to treat the advertising segments based on the advertising playback policies and the tags demarcating the beginning and ending of advertising content in the manifest file.

In some variations for additional content security, each segment (or .ts file) is tokenized at the time the advertisement is stitched in. This approach can result in URLs in the manifest file that are only valid for a predetermined time frame. Outside of the predetermined time frame, the system can remove access to the tokenized segments, delete the tokenized segments, and/or move the tokenized segments to another URL. The predetermined time frame can be different for each chunk listed in the manifest file. For example, the system can determine that chunk X occurs 35 minutes in to the media presentation represented by the manifest file. Then the system can set the predetermined time frame for that chunk to start at the time of the request for the manifest file and to end at the time of the request for the manifest file plus 40 minutes. The beginning and ending of the predetermined time frame can be earlier or later, based on a desired access policy, such as providing the user with the ability to pause, rewind, and fast forward through the video.

For content security and/or digital rights management purposes, the computing device that generates the manifest files can only generate manifest files in response to requests originating from one of a list of allowed domains, devices, and/or users. In this way, even if the computing device faces the Internet, only specific allowed users can successfully make requests. Requests not originating from an allowed source are thus unable to get any content to play.

Figure 6:
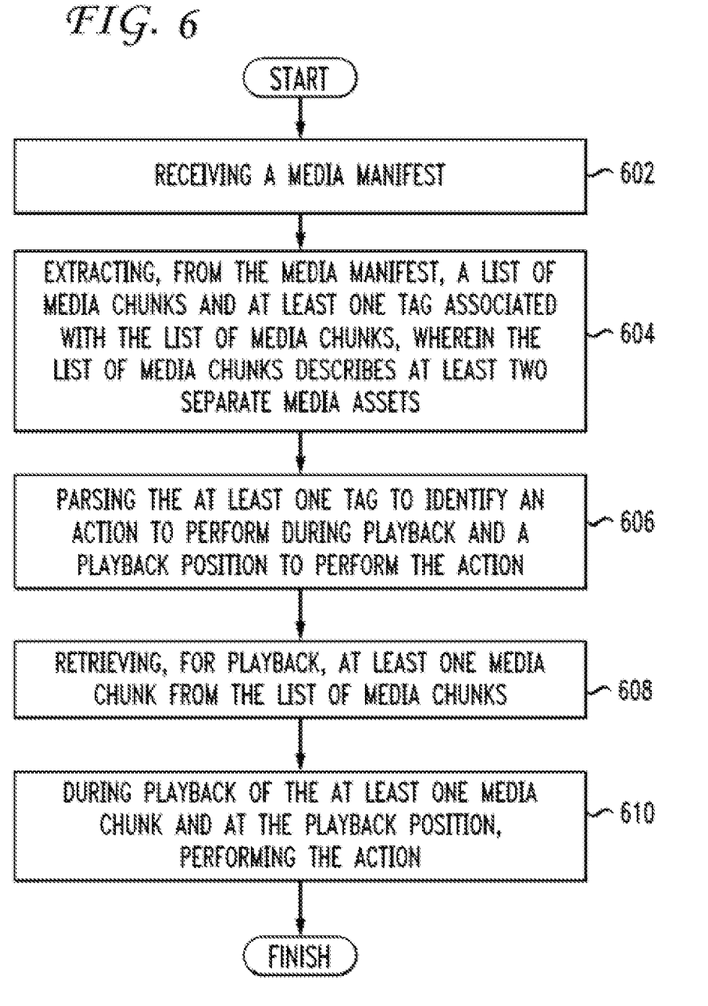
FIG. 6 illustrates an example method embodiment for performing actions, at a media player, based on tags in a media manifest.
Figure 7:
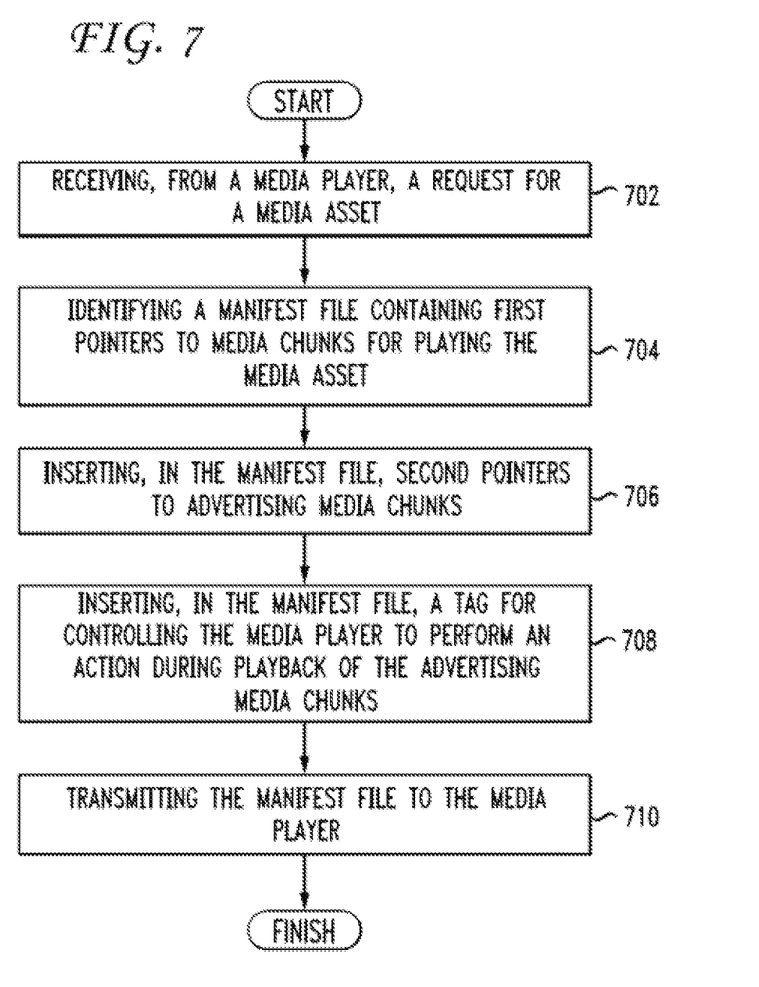
FIG. 7 illustrates an example method embodiment for generating a media manifest containing tags for controlling a media player.

Having disclosed some basic segmenting, advertising insertion, and tag-based media player control concepts for streaming media based on manifest files, the disclosure now turns to the exemplary method embodiments shown in FIGS. 6 and 7 for performing actions at a media player based on tags in a media manifest and for generating a media manifest containing tags for controlling a media player. For the sake of clarity, each of the methods is discussed in terms of an exemplary system 100 as shown in FIG. 1A configured to practice the respective method. The steps outlined herein are exemplary and can be implemented in any combination thereof, including combinations that exclude, add, or modify certain steps.

FIG. 6 illustrates an example method embodiment for performing actions, at a media player, based on tags in a media manifest. First, the system 100 receives a media manifest (602), such as an m3u8 or other manifest file. The system 100 extracts, from the media manifest, a list of media chunks and at least one tag associated with the list of media chunks (604). The list of media chunks can describe two or more separate media assets. The at least one tag can further identify a duration for the action. The action can include modifying at least one media playback control of the media player. The two separate media assets can be, for example, a main media asset and an advertising media asset, although the principles disclosed herein apply equally to a single media asset approach. One of the two separate media assets can be a commercial, preview, station identifier, logo, public service announcement, or any other interstitial media for insertion into the media presentation during playback.

The system 100 parses the at least one tag to identify an action to perform during playback and a playback position to perform the action (606). Tags can indicate a link to external information associated with the advertising media asset. The advertising media asset can include a plurality of individual advertisements. The system 100 retrieves, for playback, at least one media chunk corresponding to the playback position from the list of media chunks (608).

The system 100 performs the action during playback of the at least one media chunk and at the playback position (610). The action can include one or more sub-actions such as modifying at least one media playback control of the media player, such as temporarily disabling the at least one media playback control. The action can include, for example, sub-actions of fetching, based on the at least one tag, a companion advertisement associated with the advertising media asset, and displaying the companion advertisement simultaneously with the advertising media asset. The companion advertisement can be displayed on a same device as the media player or on a different device or devices.

FIG. 7 illustrates an example method embodiment for generating a media manifest containing tags for controlling a media player. The system 100 receives, from a media player, a request for a media asset (702) and identifies a manifest file containing first pointers to media chunks for playing the media asset (704). Then the system 100 inserts, in the manifest file, second pointers to advertising media chunks (706), inserts, in the manifest file, a tag for controlling the media player to perform an action during playback of the advertising media chunks (708). Then the system transmits the manifest file to the media player (710).

The system 100 can be a central media server storing the media presentation chunks, the advertising chunks, and the video manifest file. Alternatively, multiple separate systems can perform different portions of the functionality described herein. In this way, the system can overcome the limitations of existing manifest files for inserting advertisements into streaming media while avoiding the stops, stutters, and imprecise boundary handling in streaming videos with embedded advertisements.

The generation or fetching of a manifest file can be triggered by a request from a playback device for a particular piece of media. A manifest file server can select and stitch advertising chunks into the video manifest file on the fly in response to a request and include tags for controlling the playback device during the advertising chunks' playback and/or at other times. The manifest file server can further retrieve or infer user information, such as user preferences, location, social networking information, demographic information, age, gender, viewing history, purchasing history, and so forth, and select particular advertisements and the particular types and arrangement of tags to stitch in to the manifest file based on all or part of that information. For example, if a user has paid for a premium media account, the manifest file server can include fewer tags or less restrictive tags in the manifest file controlling how the playback device performs during advertisements.

The manifest file server can identify an advertising slot in a media presentation, such as a chapter break or designated commercial break. The system can identify multiple advertising slots of different durations in a single media presentation and provide a different set of tags in the manifest file for each advertisement, based on the type of advertisement, duration of the advertisement, an advertiser profile, a user profile, the playback device capabilities, the main media, user demographics, date, time, and so forth.

In one variation, the system 100 is a server that provides manifest files to a playback device. The server may not optionally generate the manifest files, but only modifies existing manifest files to include appropriate tags for controlling the playback device. The server can then serve the manifest files to the playback device. In another variation, the system 100 is a server that provides all aspects of streaming media, including dividing the media and advertisements, generating the manifest file, inserting tags into the manifest file, transmitting the manifest file to the playback device, and streaming chunks to the playback device based on the manifest file.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to any streaming media that is divided into chunks, including audio playback, text, or elements of an interactive environment. Those skilled in the art will readily recognize various modifications and changes that may be made to the principles described herein without following the example embodiments and applications illustrated and described herein, and without departing from the spirit and scope of the disclosure.

We claim:

1. A method for playing a mid-roll advertisement during media playback, the method comprising:
   receiving, at a media player, a media manifest file, the media manifest file comprising a set of operations to be performed sequentially by the media player, the media manifest file indicating a sequence of chunks of media content for retrieval and a length of each of the chunks, wherein the lengths are variable and selected such that a chapter break in the media content temporally aligns with a beginning of a chunk and wherein each of the lengths are equal to or below predefined maximum chunk length;
   retrieving a first chunk of media content based on a pointer specified in the media manifest file and playing the first chunk of media content;
   at a chapter break, extracting by a processor, from the media manifest file, at least one tag associated with a chunk of advertising content to be played by the media player, the tag comprising instructions to disable at least one media player control during playback of the chunk of advertising content and the tag specifying a length of time to disable the identified media player control;

parsing the at least one tag to identify 1) a media player control to be disabled during playback of the chunk of advertising content and 2) the length of time to disable the identified media player control;

retrieving, for playback, the chunk of advertising content;

playing the chunk of advertising content;

during playback of the chunk of advertising content, disabling the at least one media player control for the specified length of time based on the at least one tag in the media manifest file associated with the chunk of advertising content; and following playback of the chunk of advertising content, retrieving and playing a second chunk of media content specified in the media manifest file.

2. The method of claim 1, wherein the media manifest file is an m3u8 file.

3. The method of claim 1, further comprising:

fetching, based on the at least one tag, a companion advertisement associated with the chunk of advertising content; and transmitting the companion advertisement to a remote device for displaying simultaneously with the chunk of advertising content.

4. The method of claim 1, wherein the at least one tag indicates a link to external information associated with the chunk of advertising content.

5. The method of claim 1, wherein the chunk of advertising content comprises at least a portion of a plurality of individual advertisements available for selection by the advertising server.

6. The method of claim 1, wherein the at least one tag further comprises instructions for controlling mechanical hardware of a device hosting the media player based on the playback of the media content.

7. The method of claim 6, wherein the instructions control the hardware to vibrate.

8. The method of claim 1, wherein the at least one tag further comprises instructions for controlling an appearance of a user interface of the media player.

9. The method of claim 1, wherein the at least one tag further comprises instructions for controlling a communication connection between the media player and a remote device.

10. The method of claim 1, wherein the at least one tag further comprises a label indicating at least one of: importance of a segment of the chunk of media content, child-inappropriate portions of the media content, major plot points in the media content, and introduction of main characters in the media content.

11. A method for generating a media manifest file for playback of a media asset and advertising content on a media player, the media asset comprising a plurality of chapters separated by chapter breaks, the method comprising:

receiving a request for the media manifest file;

creating, by a processor, the media manifest file for the media asset, the media manifest file comprising a set of operations to be performed sequentially by the media player and indicating first pointers pointing to a sequence of chunks of the media asset and indicating the lengths of each of the chunks, wherein the lengths of the chunks are of variable length and are such that each of the chapter breaks in the media asset temporally aligns with a beginning of a chunk and wherein each of the lengths are equal to or below a predefined maximum chunk length;

inserting, in the media manifest file for the media asset, second pointers to advertising media chunks, the advertising media chunks inserted following one of the chapter breaks in the sequence of media chunks of the media asset;

inserting, in the media manifest file, a tag for controlling the media player to disable at least one media player control for a length of time during playback of the advertising media chunk, the length of time specified by the tag; and transmitting the media manifest file to the media player.

12. The method of claim 11, wherein the tag comprising additional instructions to at least one of temporarily disabling the at least one media playback control, enhancing the at least one media playback control, and adding a new media playback control.

13. The method of claim 11, wherein the media manifest file is an m3u8 file.

14. The method of claim 11, wherein the tag includes at least one of a first link to external information associated with the chunk of advertising content and a second link to external information associated with the media asset.

15. The method of claim 11, wherein the at least one tag further comprises instructions for controlling mechanical hardware of a device hosting the media player based on the playback of the media content.

16. The method of claim 11, wherein the at least one tag further comprises a label indicating at least one of: importance of a segment of the chunk of media content, child-inappropriate portions of the media content, major plot points in the media content, and introduction of main characters in the media content.

17. A non-transitory computer-readable storage medium storing instructions for playing a mid-roll advertisement during media playback, the instructions when executed by a processor causing the processor to perform steps including:

receiving a media manifest file, the media manifest file comprising a set of operations to be performed sequentially by a media player, the media manifest file indicating a sequence of chunks of media content for retrieval and a length of each of the chunks, wherein the lengths are variable and selected such that a chapter break in the media content temporally aligns with a beginning of a chunk and wherein each of the lengths are equal to or below a predefined maximum chunk length;

retrieving a first chunk of media content based on a pointer specified in the media manifest file and playing the first chunk of media content;

at a chapter break, extracting, from the media manifest file at least one tag associated with a chunk of advertising content to be played by the media player, the tag comprising instructions to disable at least one media player control during playback of the chunk of advertising content and the tag specifying a length of time to disable the identified media player control;

parsing the at least one tag to identify 1) a media player control to be disabled during playback of the chunk of advertising content and 2) the length of time to disable the identified media player control;

retrieving, for playback, the chunk of advertising content;

playing the chunk of advertising content;

during playback of the chunk of advertising content, disabling the at least one media player control for the specified length of time based on the at least one tag in the media manifest file associated with the chunk of advertising content; and following playback of the chunk of advertising content, retrieving and playing a second chunk of media content specified in the media manifest file.

18. The non-transitory computer-readable storage medium of claim 17, wherein the media manifest file is an m3u8 file.

19. The non-transitory computer-readable storage medium of claim 17, wherein the at least one tag further comprises instructions for controlling mechanical hardware of a device hosting the media player based on the playback of the media content.

20. The non-transitory computer-readable storage medium of claim 17, wherein the at least one tag further comprises a label indicating at least one of: importance of a segment of the chunk of media content, child-inappropriate portions of the media content, major plot points in the media content, and introduction of main characters in the media content.

* * * * *